United States Patent
Hayashi

(10) Patent No.: US 6,220,106 B1
(45) Date of Patent: Apr. 24, 2001

(54) TAKE-UP PULLEY IN AN IMAGE PROCESSOR

(75) Inventor: Eiichi Hayashi, Ohmiya (JP)

(73) Assignee: Fuji Photo Optical Co., Ltd. (JP)

( * ) Notice: Subject to any disclaimer, the term of this patent is extended or adjusted under 35 U.S.C. 154(b) by 0 days.

(21) Appl. No.: 09/310,392

(22) Filed: May 12, 1999

(30) Foreign Application Priority Data

May 13, 1998 (JP) .................................................. 10-146698

(51) Int. Cl.[7] .................................................. F16H 27/02
(52) U.S. Cl. .......................................... 74/89.22; 74/89.2
(58) Field of Search ............................ 74/89.22, 89.2; 242/606, 366

(56) References Cited

U.S. PATENT DOCUMENTS 4,254,917 * 3/1981 Okamura et al. ................... 242/68.5
4,993,655 * 2/1991 Gelardi et al. ....................... 242/71.8

* cited by examiner

Primary Examiner—Lenard A. Footland
(74) Attorney, Agent, or Firm—Price, Heneveld, Cooper, DeWitt & Litton

(57) ABSTRACT

A take-up pulley for a carrier in an image processor has a drum-like section with a boss-like projection extending from one end. In one embodiment, a recess is formed at the other end of the drum-like section for receiving a bearing. A stopper flange is formed at the end of the drum-like section adjacent the boss-like projection. The take-up pulley can be formed by a suitable molding process such as extrusion using the mold adapted to be opened axially. The take-up pulley is fixedly mounted on the driving shaft in the housing of an image processor so that a gap G smaller than a diameter of a drive wire may be formed between the end surface of the drum-like section and an inner wall of the housing. In another embodiment, an annular stopper plate is affixed to the end of the drum section instead of the recess.

10 Claims, 5 Drawing Sheets

TAKE-UP PULLEY IN AN IMAGE PROCESSOR

BACKGROUND OF THE INVENTION

1. Field of the Invention

This invention generally relates to an image processor such as a copying machine or a scanner functioning to read images of an original represented on a paper sheet or the like and then to subject these images to various kinds of processing and more particularly to a take-up pulley mounted on a driving shaft in such image processor to take up/let out the wire operatively associated with a carrier adapted to scan the original and thereby to transmit a drive force from an electric motor to said carrier.

2. Description of the Related Art

The function of the carrier in the image processor is to pick up images to be processed from the original and to guide them to an image processing unit such as a CCD. To achieve this, the carrier is provided with a reflector or the like adapted to form an optical path extending from the original to said CCD. The carrier thus scans the original and picks up the images on said original. The carrier is operatively associated with a wire taken up on a pulley by motor power so that said scanning is performed as said wire travels. One end of the wire is attached to the inner wall of the housing containing said carrier. The other end of the wire is also attached to the inner wall of the housing but with interposition of a tension spring, for example, in the form of a tension coil spring so that the tension spring puts the wire under a tension required for properly driving the carrier. An intermediate length of the wire is fixed directly on the carrier or extended around guide pulleys which are rotatably supported by the carrier. Said intermediate length of the wire is also wound around said take-up pulley by a desired number of turns.

FIG. 6 is a side view showing an example of a conventional take-up pulley 50 shown partially in cross-section. As shown, this take-up pulley 50 of prior art comprises a drum-like section 51 on which the wire is taken up and a boss 52 formed at one end of said drum 51. The drum 51 is formed at its axially opposite ends with stopper flanges 53, respectively, in order to prevent the wire (not shown) wound around said drum 51 from slipping off. This prior art take-up pulley 50 is formed by machining metallic material or made of sintered metal.

However, the take-up pulley 50 of the prior art, made of metallic material or sintered metal, necessarily leads to a high manufacturing cost of the pulley itself and a correspondingly high manufacturing cost of the image processor as a whole. To overcome this cost problem, it has been proposed to mold the take-up pulley of a suitable synthetic resin material.

FIG. 7 illustrates a mold construction which has been adopted to make the take-up pulley by molding a suitable synthetic resin material. As illustrated therein, the mold consists of a pair of split mold sections 54a, 54b adapted to be opened radially of the drum 51 so axially opposite ends of the drum 51 can be formed with said stopper flanges 53. Such arrangement of the mold is inevitably accompanied with the problem that a desired out of roundness may not be ensured for the drum 51.

SUMMARY OF THE INVENTION

In view of the problem as has been pointed out, it is a principal object of the invention to provide a take-up pulley used in an image processor so improved that not only an effective cost reduction but also an out of roundness desired for the pulley drum-like section can be achieved even when the take-up pulley is formed by molding of a suitable synthetic resin material.

The object set forth above is achieved, according to the invention, by a take-up pulley made of synthetic resin by a suitable molding process and fixedly mounted on a driving shaft in an image processor to take up a carrier driving wire. Said take-up pulley comprises a drum-like section around which said wire is taken up, a boss-like projection extending from an end surface of said drum-like section, and a stopper flange formed on said end surface from which said boss-like projection extends. Said stopper flange has an appropriate thickness and a diameter slightly larger than said drum-like section.

The take-up pulley is made of synthetic resin material by a suitable molding process such as an extrusion molding, and, therefore, the take-up pulley can be easily manufactured at a relatively low cost. Additionally, only one end of the drum-like section is formed with said stopper flange so that the mold can be opened axially of the drum-like section and thereby an out of roundness desired for the drum-like section can be reliably obtained.

Preferably, said take-up pulley is fixedly mounted on said driving shaft so that a gap smaller than a diameter of said wire may be formed between said end surface of said drum-like section opposite said boss-like projection and an inner wall of a housing of said image processor. Said collar is formed at only one end of the drum-like section so that, in a molding process of the take-up pulley, the mold can be opened axially of the drum-like section. Although slipping off of the wire might otherwise occur at the other end of the drum-like section, such slipping off of the wire can be reliably prevented by positioning said other end of the drum-like section closely adjacent the inner wall of the housing.

Preferably, said end surface of the drum-like section opposite said boss-like projection is formed with a recess adapted for partially receiving a bearing for said driving shaft. Said recess is shaped to partially receive the bearing for said driving shaft to enable a dimension of said gap defined between said end surface of the drum-like section opposite said boss-like projection and the inner wall of the housing to be easily adjusted. Preferably, the end of said drum-like section opposite said boss-like projection is provided with a stopper member radially extending beyond a periphery of said end.

After the take-up pulley has been molded, the end of the drum-like section opposite the boss-like projection is provided with the stopper member having its periphery radially extending beyond a periphery of said end, and, therefore, it is unnecessary to utilize the inner wall of the housing for prevention of the wire's slip-off. The stopper member may be in the form of an annular plate having an outer diameter slightly larger the outer diameter of the drum-like section and an inner diameter larger than the outer diameter of the driving shaft. Such stopper member may be adhesively bonded to or heat-sealed with the end surface of the drum-like section. Alternatively, the stopper member may be in the form of an annular member having an inner diameter substantially same as the outer diameter of the drum-like section and an appropriate outer diameter and may be tightly extended over an end of the drum-like section.

These and other features, objects and advantages of the present invention will become apparent upon reading the following description thereof together with reference to the accompanying drawings.

DETAILED DESCRIPTION OF THE EMBODIMENTS

Details of the inventive take-up pulley in an image processor will be more fully understood from the description of the preferred embodiments given hereunder with reference to the accompanying drawings.

Figure 4:
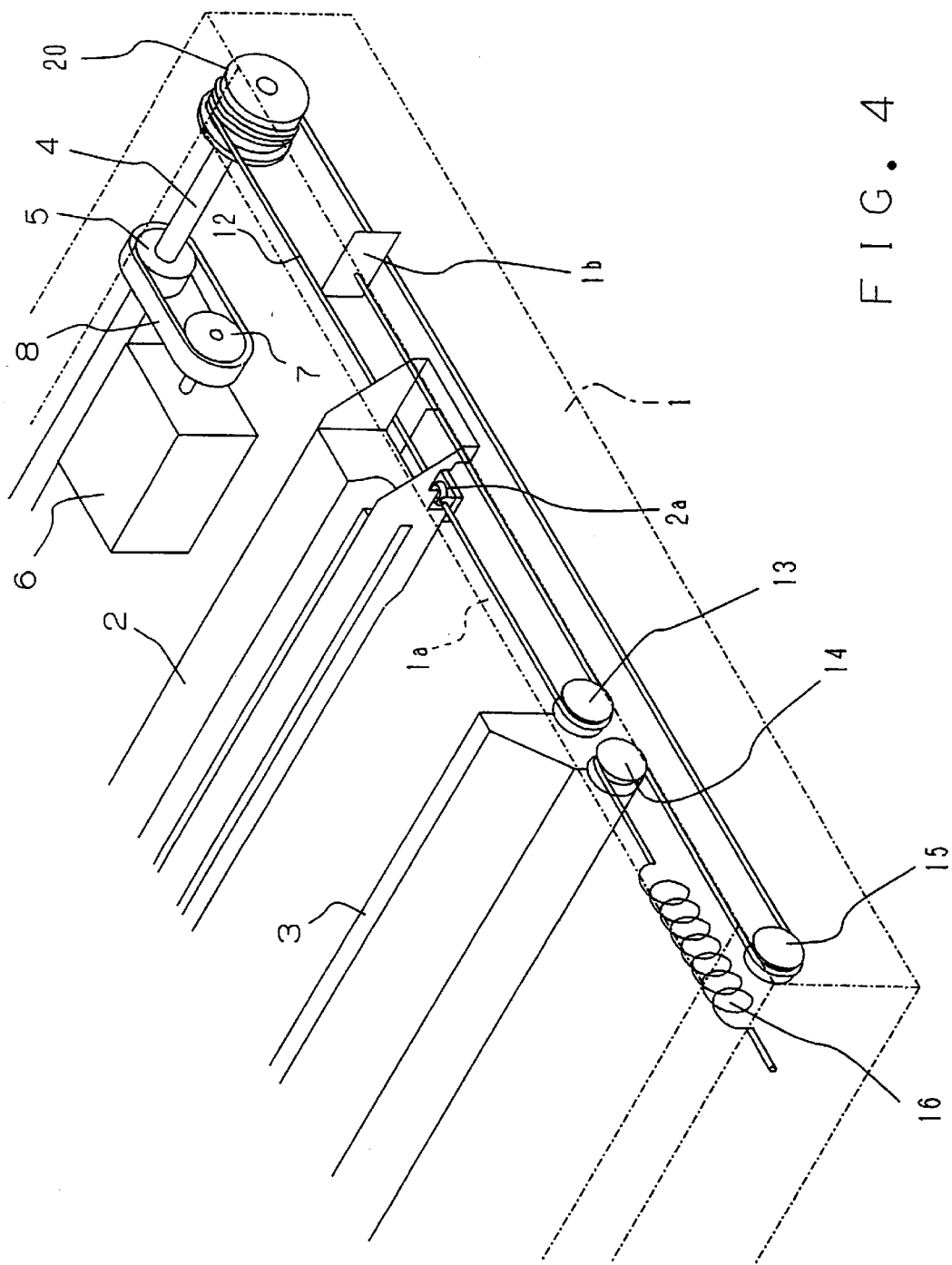
FIG. 4 is a fragmentary schematic perspective view of carriers adapted to be driven by the driving wire wound around the inventive take-up pulley illustrating a mechanism for driving said carriers.

A carrier driving mechanism is briefly described with reference to FIG. 4. A housing 1 for the image processor is formed with a pair of guides la defined by steps extending inwardly from respective inner surfaces of transversely opposite side walls of said housing 1. These guides la extend longitudinally of said housing 1 so that a first carrier 2 and a second carrier 3 placed on said guides la may be slidably moved thereon. Carriers 2, 3 are provided with reflectors (not shown) in an appropriate manner so as to define an optical path serving to direct an image on an original (not shown) placed upon a top surface of the housing 1 toward a pick-up element such as a CCD (not shown). The image is read from the original as these carriers 2, 3 slidably move along the original to scan it. During this movement for scanning, a predetermined relationship must be maintained between the first and second carriers 2, 3 so that the length of the optical path is maintained constant.

A driving shaft 4 having its axis orthogonal to the scanning direction of the carriers 2, 3 is rotatably supported by one of longitudinally opposite ends of the housing 1. Said shaft 4 is provided at its longitudinal middle with a driven pulley 5 fixed thereon. A loop of driving belt 8 extends over said driven pulley 5, on one side, and on a driving pulley 7 fixed around an output shaft of an electric motor 6, on the other side. This driving shaft 4 carries on its longitudinally opposite ends take-up pulleys 20 adapted to be rotated together with said driving shaft 4. An intermediate length of wire 12 is wound on each of said take-up pulleys 20 by an appropriate number of turns. A pair of guide pulleys 13, 14 arranged side by side in the scanning direction are supported on each of longitudinally opposite end surfaces of the second carrier 3 so that these guide pulleys 13, 14 can be rotated around their axes which are orthogonal to said scanning direction. At an end of the housing 1 opposite said end rotatably supporting said driving shaft 4, guide pulleys 15 are supported by said housing 1 so that these guide pulleys 15 can be rotated around their axes which are orthogonal to said scanning direction. The respective side walls of the housing 1 are provided at appropriate locations with brackets 1b. It should be understood that the respective pairs of take-up pulleys 20, wires 12, guide pulleys 13, 14, 15 and brackets 1b are arranged on opposite sides of and within the housing 1 so as to be mutually opposed with a scanning zone of the carriers 2, 3 therebetween.

One end of the wire 12 having its intermediate length wound around one of the take-up pulleys 11 extends by way of means 2a operatively associated with the first carrier 2, then one of said guide pulleys 13 and is anchored on one of said brackets 1b. The other end of the wire 12 successively goes by way of respective said guide pulleys 15, 14 and is anchored on one of longitudinally opposite end walls of the housing 1 with interposition of a tension spring 16, for example, in the form of a tension coil spring.

Figure 2:
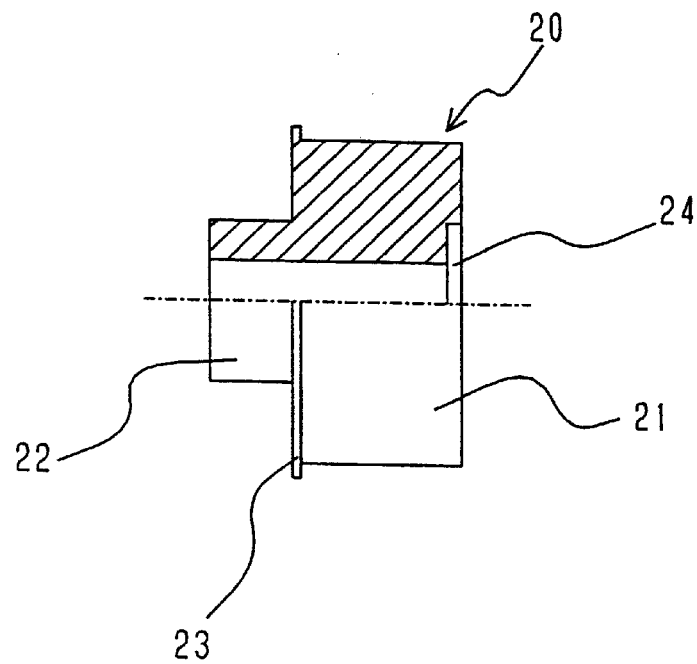
FIG. 2 is a side view showing, partially in a section, the inventive take-up pulley isolated from the image processor.

As will be apparent from FIG. 2, each of said take-up pulleys 20 has a generally cylindrical drum-like section 21 having a diameter of from about 30 to 40 mm depending on the particular image processor. A boss-like projection 22 is integrally formed on one end of said drum-like section 21 and extends axially therefrom. Said drum-like section 21 is formed at its end surface which is adjacent said boss-like projection 22 with a relatively thick radially extending stopper flange 23 having an outer diameter slightly larger than that of said drum-like section 21 and a thickness of from about 1 to 2 mm. Drum-like section 21 is formed with a recess 24 of an appropriate diameter defined around a rotation axis of said take-up pulley 20 at its end surface which is opposed to said boss-like projection 22. Boss 22 is employed to attach pulley 20 to shaft 4 utilizing one or more conventional set screws. In some embodiments, boss 22 could be eliminated and set screws recessed in drum-like section 21 attach pulley 20 to the shaft 4. The take-up pulley 20 is produced by a suitable molding process such as an extrusion molding of synthetic resin. In such molding process, a mold is preferably adapted to be opened axially of the take-up pulley 20. It is desirable to perform such molding process without providing the drum-like section 21 with any draft taper since the end of the drum-like section 21 opposed to the stopper flange 23 would be diameter-reduced if said draft taper is provided in order to facilitate removal of the mold.

Figure 1:
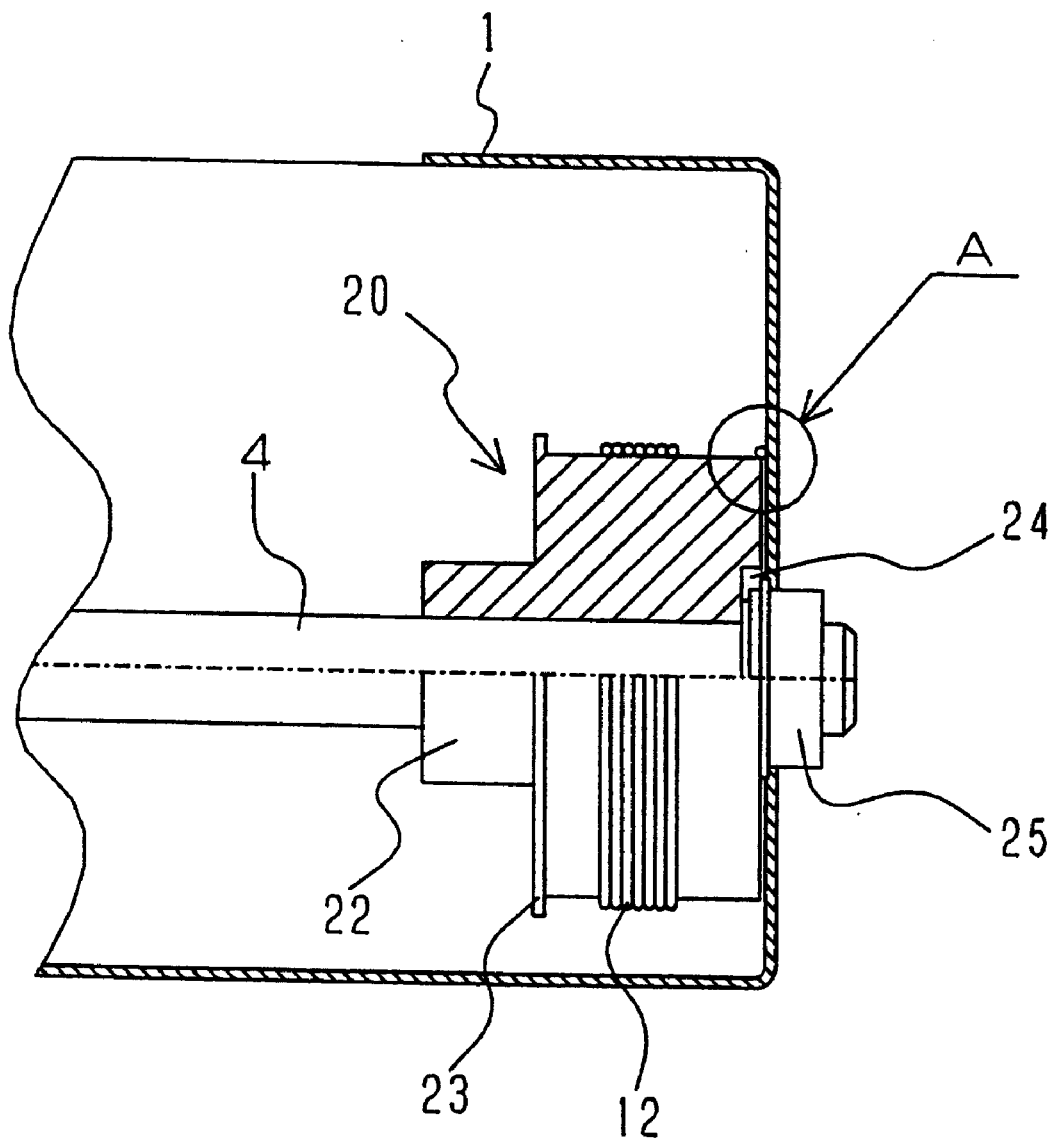
FIG. 1 is a fragmentary side view, partially in a section, showing an embodiment of the inventive take-up pulley together with the image processor equipped with said take-up pulley.
Figure 3:
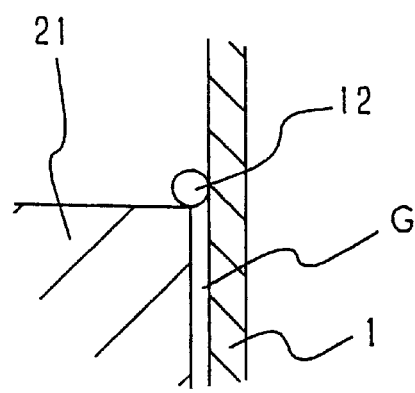
FIG. 3 is an enlarged fragmentary sectional view showing the encircled portion A in FIG. 1.

FIG. 1 illustrates the take-up pulley 20 incorporated in said carrier driving mechanism. As illustrated, said driving shaft 4 is supported in the housing 1 by a bearing 25. The end surface of the drum-like section 21 opposed to the boss-like projection 22 is positioned closely adjacent the inner wall of the housing 1 so that said bearing 25 may be partially received by said recess 24. In the present embodiment, said end surface of the drum-like section 21 is spaced from the inner wall of the housing 1 by a gap G which is dimensioned to be less than a diameter of the wire 12, as will be apparent from FIG. 3.

As has already been described, the take-up pulleys according to the invention are produced by a suitable molding process such as an extrusion molding of synthetic resin material. In such molding process, the mold may be adapted to be opened axially of the take-up pulley 20 and thereby the drum-like section 21 may be produced by a single mold. This advantageously allows said drum-like section 21 to have an out of roundness as accurate as desired.

As shown in FIG. 1, the take-up pulley 20 is fixedly mounted on the driving shaft 4 and has said wire 12 wound therearound. In this state, the wire 12 is reliably prevented by the stopper flange 23 formed the end surface of the drum-like section 21 adjacent the boss-like projection 22 from laterally shifting from said drum-like section 21 toward said boss-like projection 22 until said wire 12 slips off from said boss-like projection 22. The end surface of said drum-like section 21 opposite said boss-like projection 22 is positioned closely adjacent the inner wall of the housing 1, i.e., spaced from the latter by a gap G which is dimensioned to be less than the diameter of the wire 12. With such arrangement, the wire 12 is prevented by the inner wall of the housing 1 from slipping off from said drum-like section 21 even if said wire 12 laterally shifts on said drum-like section 21 toward said inner wall of the housing 1. The depth of the circular recess 24 in the end surface of the drum-like section 21 adapted to receive the bearing 25 allows the dimension of said gap G to be easily adjusted.

Figure 5:
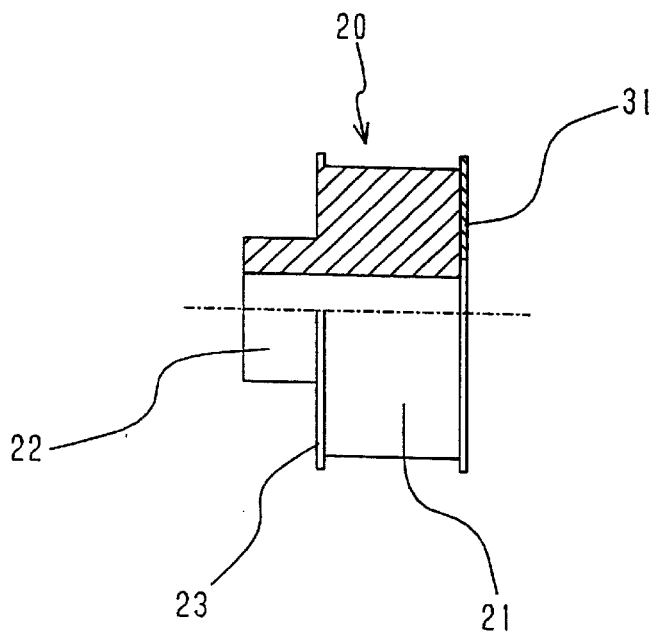
FIG. 5 is a side view, partially in a section, showing an alternative embodiment of the inventive take-up pulley.
Figure 6:
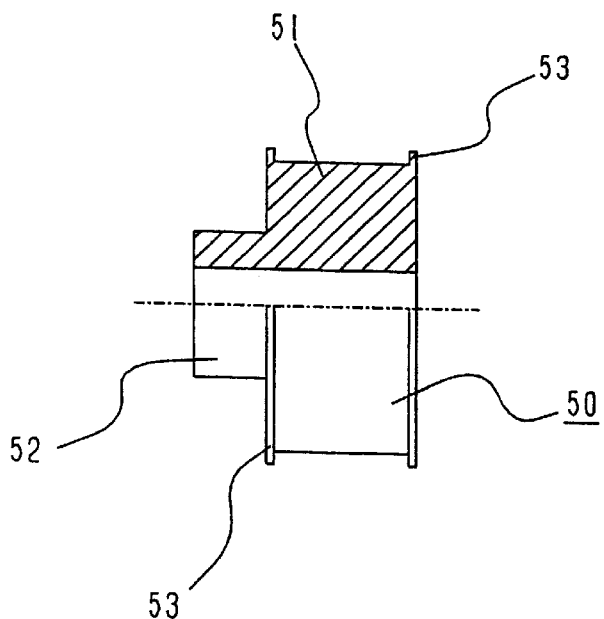
FIG. 6 is a side view, partially in a section, showing a prior art take-up pulley.
Figure 7:
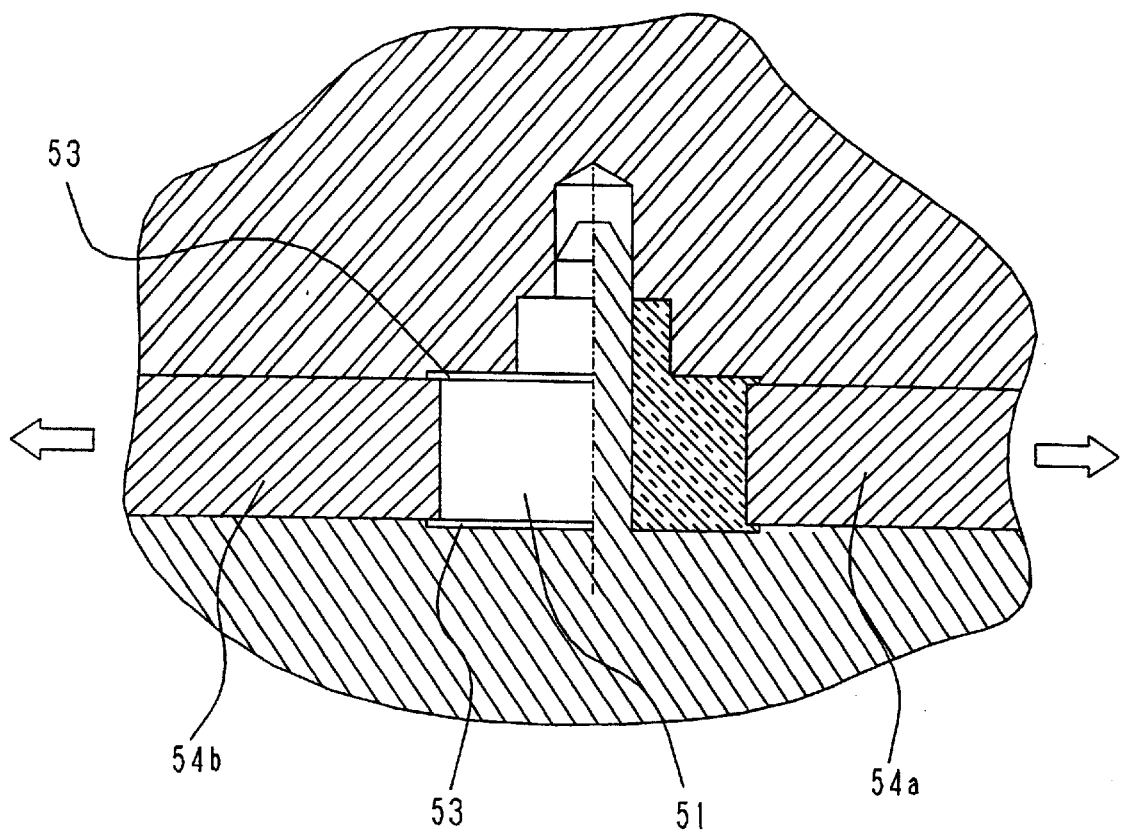
FIG. 7 is a fragmentary sectional view showing a mold conventionally used to produce a take-up pulley of the prior art from a synthetic resin material.

FIG. 5 shows an alternative embodiment of the take-up pulley 20. In the case of the take-up pulley 20 according to this embodiment, after the drum-like section 21, the boss-like projection 22 and the stopper flange 23 have been formed at once by a suitable molding process, a stopper member 31 is adhesively bonded to the end surface of the drum-like section 21 opposite the boss-like projection 22. The stopper member 31 is in the form of an annular plate having an inner diameter appropriately larger than the outer diameter of the driving shaft 4 and an outer diameter slightly larger than the outer diameter of the drum-like section 21. As a result of such dimensioning, an outer periphery of said stopper member 31 extends radially beyond the periphery of said end surface of the drum-like section 21, and this radially extending periphery of said stopper member 31 serves to prevent the wire 12 from slipping off from the drum-like section 21. In this manner, it is unnecessary for this take-up pulley 20 according to the embodiment shown by FIG. 5 to prevent the wire 12 from slipping off from the drum-like section 21 by the use of the inner wall of the housing 1.

As will be understood from the foregoing description, the inventive take-up pulley for the image processor can be easily formed by a suitable molding process from synthetic resin material at a low manufacturing cost. In addition, formation of the stopper flange at one end surface of the drum-like section may be eliminated and thereby the mold may be adapted to be open axially of the drum-like section in the molding process. This allows, in turn, a desired out of roundness of the drum-like section to be easily obtained.

Even when the drum-like section is configured, as has been described just above, so as to have said stopper flange only at one end thereof, the inner wall of the housing can be used to prevent the wire from slipping off from the drum-like section. This is achieved by fixedly mounting said take-up pulley on said driving shaft so that the gap smaller than the diameter of said wire may be formed between the end surface of the drum-like section opposite said boss-like projection and the inner wall of the housing of said image processor.

Said recess formed in the end surface of said drum-like section opposite said boss-like projection partially receives the bearing for said driving shaft so that said bearing may be adjustably positioned relatively to said recess. In this way, a dimension of said gap formed between the end surface of the drum-like section and the inner wall of the housing can be easily adjusted.

The stopper member adhesively bonded to the end surface of said drum-like section opposite said boss-like projection makes it unnecessary to prevent the wire by the inner wall of the housing from slipping off from the drum-like section. Consequently, a position at which the wire 12 should be wound around the drum-like section of the take-up pulley can be easily adjusted by moving said take-up pulley axially of the driving shaft.

These and other modifications to the preferred embodiment of the invention as described herein can be made without departing from the spirit or scope of the invention as defined by the appended claims.

What is claimed is:

1. A take-up pulley of an image processor, said pulley molded of a polymeric material for fixedly mounting to a driving shaft of an image processor to take up a carrier driving wire, said take-up pulley comprising:

a drum-like section for receiving a drive wire, said drum-like section having an end surface;

a boss-like projection extending axially from said end surface of said drum-like section, wherein said drum-like section includes a second end surface opposite said boss-like projection which is provided with a stopper member extending radially beyond a periphery of said second end surface for holding the drive wire therein; and wherein the image processor includes a housing having a wall with an inner surface adjacent said take-up pulley, and wherein said take-up pulley is fixedly mounted on a driving shaft so that a gap smaller than a diameter of said wire extends between said end surface of said drum-like section opposite said boss-like projection and said inner surface of said wall of said housing of the image processor.

2. A take-up pulley for an image processor, said pulley molded of a polymeric material for fixedly mounting to a driving shaft of an image processor to take up a carrier driving wire, said take-up pulley comprising:

a drum-like section for receiving a drive wire, said drum-like section having an end surface;

a boss-like projection extending axially from said end surface of said drum-like section; and a stopper integrally formed on said end surface, said stopper having a flange with a diameter slightly larger than said drum-like section for holding the drive wire therein, wherein the image processor includes a housing having a wall with an inner surface adjacent said take-up pulley, and wherein said take-up pulley is fixedly mounted on a driving shaft so that a gap smaller than a diameter of said wire extends between said end surface of said drum-like section opposite said boss-like projection and said inner surface of said wall of said housing of the image processor.

3. A take-up pulley in an image processor according to claim 2 wherein said drum-like section includes a second end surface opposite said boss-like projection which is formed with a recess adapted for partially receiving a bearing for said driving shaft.

4. A take-up pulley for an image processor, said pulley molded of a polymeric material for fixedly mounting to a driving shaft of an image processor to take up a carrier driving wire, said take-up pulley comprising:

a drum-like section for receiving a drive wire, said drum-like section having an end surface;

a boss-like projection extending axially from said end surface of said drum-like section; and a stopper integrally formed on said end surface, said stopper having a flange with a diameter slightly larger than said drum-like section for holding the drive wire therein, wherein said drum-like section includes a second end surface opposite said boss-like projection which is formed with a recess adapted for partially receiving a bearing for said driving shaft.

5. A take-up pulley molded of a polymeric material for fixedly mounting to a driving shaft of an image processor to take up a carrier driving wire, said take-up pulley comprising:

a drum-like section for receiving a drive wire, said drum-like section having an end surface;

a boss-like projection integrally extending axially from said end surface of said drum-like section; and a stopper integrally formed on said end surface, said stopper having a flange with a diameter slightly larger than said drum-like section for holding the drive wire therein, wherein said second end surface of said drum-like section opposite said boss-like projection is formed with a recess adapted for partially receiving a bearing for said driving shaft.

6. A take-up pulley in an image processor according to claim 5 wherein the image processor includes a housing having a wall adjacent said take-up pulley, and said take-up pulley is fixedly mounted on a driving shaft so that a gap smaller than a diameter of said wire extends between said end surface of said drum-like section opposite said boss-like projection and an inner surface of said wall of said housing of the image processor.

7. An image processor comprising:

a housing having a wall;

a carrier;

a driving wire coupled to said carrier;

a driving shaft for moving said driving wire; and a take-up pulley fixedly mounted to said driving shaft, said take-up pulley integrally molded of a polymeric material, including a drum-like section around which said driving wire is taken up, and a stopper flange formed on an end surface of said drum-like section, said stopper flange having a diameter slightly greater than that of said drum-like section, wherein said take-up pulley is mounted on said driving shaft so that a gap smaller than a diameter of said driving wire extends between an end surface of said drum-like section opposite said stopper flange and an inner surface of said wall of said housing of said image processor.

8. An image processor according to claim 7 wherein said end surface of said drum-like section opposite said stopper flange integrally includes a recess and a bearing for said driving shaft extending into said recess.

9. An image processor according to claim 8 wherein an annular stopper member having a diameter greater than the diameter of said drum-like section is attached to said end of said drum-like section opposite said stopper flange.

10. An image processor according to claim 9 wherein said take-up pulley is molded of a synthetic resin.

* * * * *

UNITED STATES PATENT AND TRADEMARK OFFICE
CERTIFICATE OF CORRECTION

PATENT NO. : 6,220,106 B1
DATED : April 24, 2001
INVENTOR(S) : Eiichi Hayashi

It is certified that error appears in the above-identified patent and that said Letters Patent is hereby corrected as shown below:

<u>Column 3,</u>
Lines, 35, 37 and 39, "la" should be -- 1a --.

<u>Column 6,</u>
Line 12, "of" should be -- for --.

Signed and Sealed this

Nineteenth Day of March, 2002

Attest:

Attesting Officer

JAMES E. ROGAN
Director of the United States Patent and Trademark Office